United States Patent [19]

Gibson

[11] 4,175,432

[45] Nov. 27, 1979

[54] APPARATUS FOR TOWING AN UNDERWATER INSTRUMENTATION PACKAGE

[76] Inventor: Carl H. Gibson, 9566 La Jolla Farms Rd., La Jolla, Calif. 92037

[21] Appl. No.: 922,774

[22] Filed: Jul. 7, 1978

[51] Int. Cl.² .............................................. G01W 1/00
[52] U.S. Cl. ................................................ 73/170 A
[58] Field of Search .............. 73/170 A; 114/244, 245

[56] References Cited

U.S. PATENT DOCUMENTS

| 3,404,565 | 10/1968 | Barry et al. | 73/170 |
| 3,906,790 | 9/1975 | Brainard et al. | 73/170 |
| 4,010,706 | 3/1977 | Pretet | 73/170 X |

Primary Examiner—Herbert Goldstein
Attorney, Agent, or Firm—Fulwider, Patton, Rieber, Lee & Utecht

[57] ABSTRACT

Apparatus for towing an instrumentation "fish" in such a manner as to decouple it from vertical displacements of a towing vessel and tow line. The fish is secured to the tow line by a single pulley, on which it can move up and down the tow line, and upper and lower tethers are secured to the fish, and to upper and lower tether points on the tow line above and below the fish. Drag forces on the tethers provide a vertical restoring force on the fish, tending to maintain it in an equilibrium position between the upper and lower tether points. A wing on the fish provides substantial resistance to vertical heave, so that relatively rapid vertical movements of the tow line are heavily damped and have practically no effect on the fish.

9 Claims, 4 Drawing Figures

APPARATUS FOR TOWING AN UNDERWATER INSTRUMENTATION PACKAGE

BACKGROUND OF THE INVENTION

This invention relates generally to apparatus for towing underwater instrumentation packages from a surface ship, and, more particularly, to such apparatus used for towing packages of which the elevation has to be accurately controlled or maintained.

In oceanography, it is often important to be able to obtain an accurate profile of the variation of some basic physical parameter, such as temperature, salinity or density of the ocean, in both horizontal and vertical directions. For example, such measurement profiles are very helpful in the study of such oceanic microprocesses as turbulence and turbulent mixing. It has been found that stable stratification in the ocean prevents active turbulence in most of its fluid volume, so that velocity fluctuations, as well as resulting fluctuations of temperature, salinity and density, are often confined to isolated patches. The measurement of these parameters in relation to a fixed spatial frame of reference is, therefore, very important in the study of oceanic turbulence.

The measurement of physical properties of the ocean from a surface vessel has always presented some practical problems. Typically, measurements are made by a sensor package, often referred to as a fish, towed behind the vessel on a line that is weighted, if necessary, to depress the fish to a desired depth below the surface. The most significant practical problem in towing such a package is that the surface motion of the ship is not, of course, purely horizontal, but is affected by wave activity on the ocean surface. Pitching and rolling motions of the ship are transmitted to the fish through the towing line, so that accurate profiling measurements cannot always be obtained.

It will be appreciated from the foregoing that there has been a significant need in the field of oceanography for some means for towing an instrumentation fish in such a manner that the motion of the fish is essentially unaffected by vertical movements of the towing vessel, as may be caused by surface wave motion. The present invention fulfills this need.

SUMMARY OF THE INVENTION

The present invention resides in apparatus for towing an instrumentation package in such a manner that it is essentially decoupled from wave-induced motions of the towing vessel. Briefly, and in general terms, the apparatus of the invention includes a main tow line, one end of which is secured to the towing vessel, depressor means attached to the end of the main tow line remote from the vessel, means for securing the main tow line to the fish in such a manner that the fish is free to move vertically for some distance along the tow line, upper and lower tether means, such having a first end secured to the fish and a second end attached to the main tow line, and means on the fish for resisting vertical heave forces. The second ends of the tether means are attached at tether points spaced apart on the main tow line, and the fish can move along the tow line between the tether points.

The upper and lower tether means are lines of such length as to form trailing loops behind the main tow line, and the drag forces on the tether lines are, in part, transmitted to the fish. The vertical components of the drag forces applied to the fish by the tension in the tether lines will cancel if the fish is in an equilibrium position with respect to the upper and lower tether points on the main line. However, if the fish moves away from the equilibrium point, a restoring force supplied by one of the tether lines will move the fish back to its equilibrium point. It will be appreciated that, if the main tow line is moving in an oscillatory fashion because of surface wave motion, the main tow line will also be moving up and down in a vertical, and probably irregular fashion. However, since the fish includes means, such as a wing, for resisting vertical heave forces, the fish will tend not to follow the rapid vertical oscillations of the towing vessel, and the combined action of the wing and the tethers will effectively isolate the fish from such oscillations.

An additional advantage of the tether arrangement is that electrical data signals from sensors on the fish, and command signals to the fish, can be conveniently transmitted along conductors integral with one of the tethers.

Preferably, each tether is secured to the fish by a yoke that provides for attachment at laterally spaced points on the fish, to provide passive roll and yaw stability. In the presently preferred embodiment of the invention, the towing apparatus is attached to a twin-hulled fish having at least one intermediate wing extending between the hulls. The tethers are attached at points near the ends of the wing, and the main tow line passes through an opening at the mid-point of the wing, over a pulley mounted therein.

It will be appreciated from the foregoing that the present invention represents a significant advance in the field of oceanography. In particular, it provides a hitherto unavailable technique for decoupling a towed instrumentation package from vertical motion of the towing vessel. Other aspects and advantages of the invention will become apparent from the following more detailed description, taken in conjunction with the accompanying drawings.

DETAILED DESCRIPTION

Figure 1:
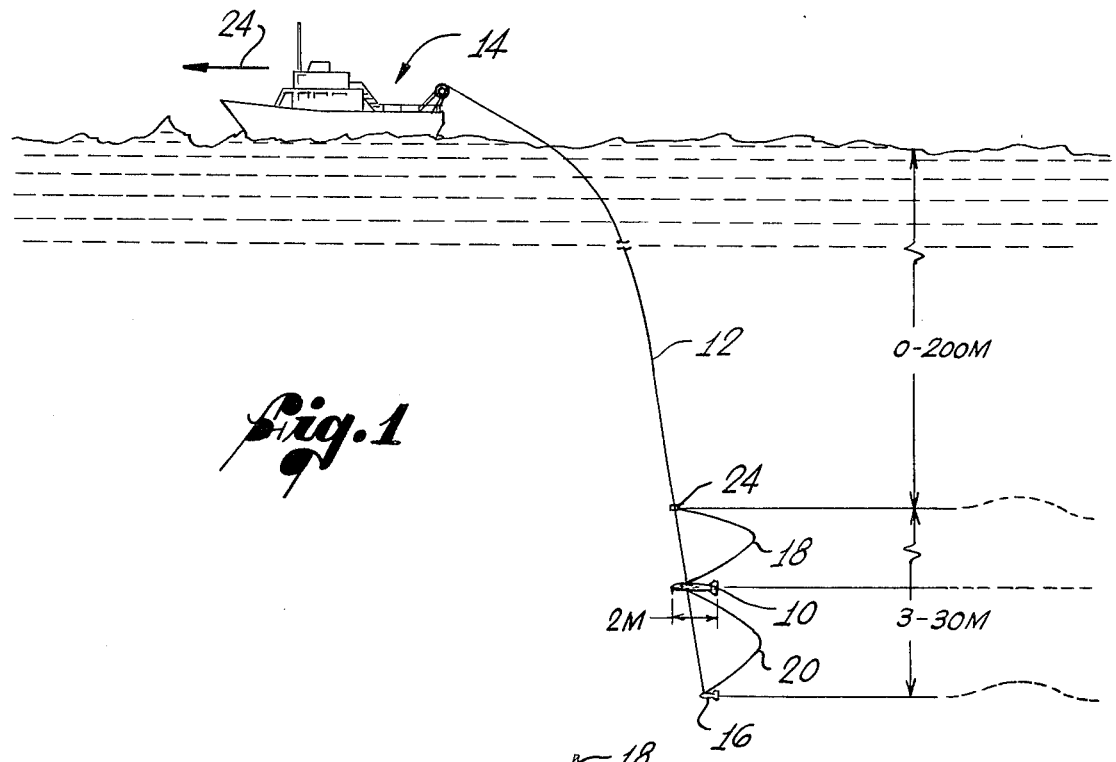
FIG. 1 is a simplified elevational view showing an instrumentation fish being towed behind a surface vessel in accordance with the principles of the invention.

As shown in the drawings, the present invention is principally concerned with a system for towing an instrumentation package beneath the surface of the ocean. As shown in particular in FIG. 1, such an instrumentation package is typically housed in a hydrodynamically shaped housing, frequently referred to as a "fish", indicated by reference numeral 10. The fish is attached to a main tow line 12, one end of which is secured to a towing vessel 14 on the ocean surface, and the other end of which has attached to it a weight or depressor 16, which may also be hydrodynamically shaped.

In accordance with the invention, the fish 10 is effectively decoupled from vertical surface motion of the vessel 14 by means of an upper tether 18 and a lower tether 20. The main towing line 12 is attached to the fish 10 principally by means of a pulley 22 (FIG. 2) mounted on the fish for rotation about a horizontal axis. The main tow line 12 passes to the rear of the pulley 22 so that, when the vessel 14 moves forward in the direction of the arrow 24, a towing force is transmitted from the line 12 to the fish 10 through the pulley 22. However, the fish 10 is free to slide up and down the main towing line 12 on the pulley 22.

The upper tether 18 is a cable having one end, its lower end, attached to the fish 10, and its upper end attached to an upper tether point 24 on the main tow line 12. Similarly, the lower tether 20 has its upper end attached to the fish 10 and its lower end secured to a lower tether point on the line 12. As illustrated, the lower tether point may be the extreme end of the main tow line 12 to which the depressor 16 is attached.

The upper and lower tethers 18 and 20 each have a length greater than the distance measured along the tow line 12 from the corresponding tether point 24 or 16 to the mid-point between these tether points. Consequently, the upper and lower tethers 18 and 20 trail behind the tow line 12 in the manner shown in FIG. 1. The tethers 18 and 20 are chosen to be of approximately equal length, and the normal equilibrium position for the fish 10 will be approximately mid-way between the upper and lower tether points 24 and 16. It will be apparent that, when the fish 10 is being towed, the tethers 18 and 20 will be subject to drag forces, and each of the tethers will thereby be placed in tension.

Figure 3:
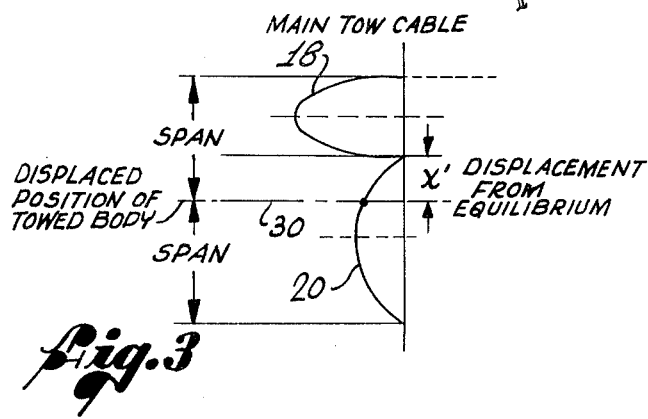
FIG. 3 is a diagrammatic view illustrating the tether geometry.

In the equilibrium position, approximately mid-way between the tether points 24 and 26, indicated at 30 in FIG. 3, the tensile forces acting on the tethers 18 and 20 at the points where they attach to the fish 10 will be approximately equal, and the angles at which these forces act with respect to the fish will also be approximately equal. Consequently, the components of these tensile forces in a vertical direction, or more properly in a direction parallel with the main tow line 12, will cancel, and the fish will be held at the equilibrium position. However, if the fish 10 is displaced from the equilibrium position, the vertical components of the tensile forces in the tether will no longer be equal. For example, it will be apparent from FIG. 3 that the tensile force in the lower tether 20 will have a greater vertical component than that acting in the upper tether 18. Thus, there will be a downward restoring force acting on the fish 10, tending to restore it to the equilibrium position.

The effect of the tethers 18 and 20 is analagous to that of two springs acting on the mass of the fish 10 to maintain it in the equilibrium position. A further important factor determinative of the fish motion is that, as will shortly be described, the fish is designed to resist vertical heave forces. Consequently, any rapid vertical oscillation of the towing line 12 will not be transmitted directly to the fish, but will be heavily damped.

Figure 2:
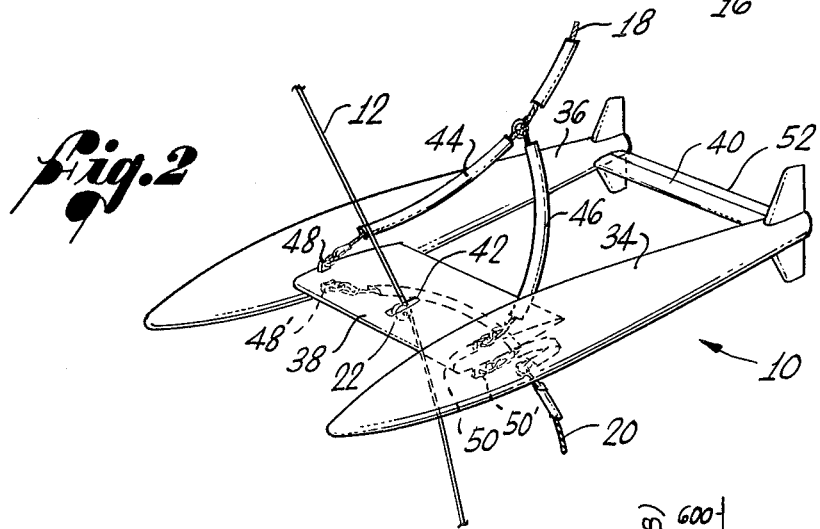
FIG. 2 is an enlarged perspective view of the instrumentation fish, showing details of attachment to the towing apparatus of the invention.

As shown in FIG. 2, the fish 10 in conjunction with which the invention is presently utilized, has twin-hulls 34 and 36, a forward intermediate wing 38 between the hulls, to provide resistance to verticle heave, and a rearward wing 40. The pulley 22 is mounted in an opening 42 at the mid-point of the forward wing 38, and toward the leading edge of the wing. Preferably, the upper tether 18 is attached to the fish 10 by means of a yoke comprising two short pieces of cable 44 and 46, which are secured to the end of the tether 18 and to attachment blocks 48 and 50, respectively, affixed to the upper surface of the forward wing 38. The attachment blocks 48 and 50 are located at opposite ends of the forward wing 38, and are aligned with the axis of the pulley 22. The lower tether 20 is similarly attached by an identical yoke arrangement secured to corresponding attachment blocks 48' and 50' on the underside of the forward wing 38. This arrangement provides passive roll and yaw stability to the fish 10.

Figure 4:
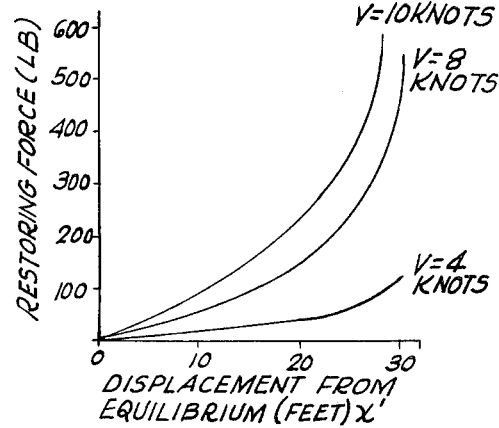
FIG. 4 is a graph showing the variation in restoring force acting on the fish, as a function of its horizontal velocity and vertical displacement from the equilibrium position.

The graph of FIG. 4 shows how the restoring force varies in relation to displacement from the equilibrium position, in a system in which the tether span, i.e., the vertical distance from either of the tether points on the tow line to the equilibrium position, is approximately 32 feet. It will be seen that the restoring force at first increases substantially linearly with the displacement from the equilibrium position, and then increases much more rapidly as the amount of displacement approaches the tether span distance. In effect, the upper and lower tethers 18 and 20 serve as hydroelastic springs acting to maintain the fish 10 in its equilibrium position. Moreover, the tension in each of the tethers 18 and 20 increases approximately as the square of the towing velocity. Since lift and drag forces acting on the fish, and particularly the resistance of the fish to vertical heave, also increase approximately as the square of the towing velocity, the decoupling action works equally well at practically all velocities.

The lengths of the upper and lower tethers 18 and 20 for optimum performance will depend, of course, on a number of factors, such as the weight of the fish 10, the towing depth, cable characteristics, and so on. As shown in FIG. 1, for towing depths down to 200 meters a span of up to 30 meters between tether points is normally required. In general, the lengths of the tethers 18 and 20 and the tow line 12 are selected to provide a desired vertical range, and at the same time to provide satisfactory decoupling. Vibration of tow line 12 or of the tethers 18 and 20, known as "strumming", can be minimized or eliminated by attaching a fairing material, such as nylon.

The trailing wing 40 of the fish 10 includes a movable flap 52, which can be used as an elevator control to adjust the attitude of the fish, and thereby provide positive or negative lift to change its elevation. In some oceanic profiling measurements, it may be desired to move the fish 10 up and down, to follow the positional variation of a constant temperature region, for example. The extent of the controlled vertical displacement of the fish 10 would, of course, be limited by the tether span, and the tethers 18 and 20 would still act to apply a restoring force tending to bring the fish back to its original equilibrium position. The positive or negative lift on the fish would be effective to establish a new equilibrium position, and the decoupling and stabilizing action of the tethers 18 and 20 and wing 38 would be diminished to some degree once the fish was moved away from its original equilibrium position.

An additional advantage of the tether arrangement of the invention is that it provides a convenient way of making electrical connection to the fish, along one of the tethers 18 and 20. Data signals from the fish and control signals to the fish can then be conveniently transmitted.

It will be appreciated from the foregoing that the present invention represents an important advance in the field of oceanography generally, since it provides a hitherto unavailable technique for decoupling a towed instrumentation package from random vertical motions of the towing vessel. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. Apparatus for towing an underwater instrumentation fish, said apparatus comprising:
 a main tow line secured to a towing vessel;
 depressor means attached to said tow line to depress it below the surface of the water;
 means for attaching the fish to said line to permitting movement of the fish along said line;
 upper tether means secured to the fish and to an upper tether point on said line;
 lower tether means secured to the fish and to a lower tether permit on said line; and
 means integral with the fish, for resisting vertical heave forces;
 whereby drag forces on said upper and lower tether means are transmitted to the fish and tend to maintain it in an equilibrium position between said upper and lower tether points, and whereby rapid vertical oscillations of said tow line, caused by surface motion of the towing vessel, are heavily damped and not transmitted to the fish.

2. Apparatus as set forth in claim 1, wherein:
 said means for resisting vertical heave is a wing on the fish; and
 said means for attaching the fish to said tow line is a pulley mounted for rotation about a horizontal axis, said tow line passing to the rear of said pulley to transmit a towing force to the fish.

3. Apparatus as set forth in claim 2, wherein:
 said upper and lower tether means each include a yoke for attachment at a plurality of spaced-apart locations on the fish, to provide additional stability.

4. Apparatus as set forth in claim 3, wherein each of said yokes is attached to said wing at two points located approximately on the axis of said pulley and spaced symmetrically with respect to said pulley.

5. Apparatus as set forth in claim 1, and further including means for applying positive or negative lift to the fish to change its equilibrium position with respect to said upper and lower tether points.

6. For use in towing an underwater instrumentation fish, towing apparatus comprising:
 a main tow line secured to a towing vessel;
 means for attaching the fish to said tow line to permit movement along said line;
 means for tending to maintain the fish at an equilibrium position on said line; and
 means integral with the fish, for resisting vertical movements thereof, whereby rapid vertical oscillations of the towing vessel and tow line are heavily damped and the fish is essentially decoupled from such oscillations.

7. Towing apparatus as set forth in claim 6, wherein:
 said means for attaching the fish to said tow line is a pulley mounted in the fish for rotation about a horizontal axis, and said line passes to the rear of said pulley in engagement therewith; and
 said means tending to maintain the fish at an equilibrium position includes upper and lower tether lines, each secured to the fish, and secured to upper and lower tether points, respectively, on said tow line, whereby drag forces on said tether lines are in part transmitted to the fish and tend to maintain it in the equilibrium position.

8. Towing apparatus as set forth in claim 7, wherein:
 said means for resisting vertical movements is a wing;
 said pulley is mounted in said wing; and
 said tether lines are attached to upper and lower surfaces of said wing.

9. Towing apparatus as set forth in claim 7, wherein electrical connection to the fish is made along one of said tether lines.

* * * * *